United States Patent [19]
Knittel et al.

[11] Patent Number: 5,783,274
[45] Date of Patent: Jul. 21, 1998

[54] PRESSURE SENSITIVE ADHESIVE CLOSURE SYSTEM FOR FOAM INSULATION

[75] Inventors: Gerald H. Knittel, Brecksville; Paula J. Butcher, Stow; Judith A. Roth, Akron, all of Ohio

[73] Assignee: Morgan Adhesives Company, Stow, Ohio

[21] Appl. No.: 499,319

[22] Filed: Jul. 7, 1995

[51] Int. Cl.$^6$ .................................................. B29D 23/00
[52] U.S. Cl. .................. 428/36.9; 138/149; 138/151; 138/152; 428/36.91; 428/40.1; 428/41.8; 428/41.9; 428/137; 428/212; 428/214; 442/1; 442/30; 442/32; 442/43; 442/56
[58] Field of Search ..................... 428/36.5, 36.91, 428/40.1, 41.8, 41.9, 36.2, 36.9, 137, 214, 212, 354, 355; 138/149, 151, 152, DIG. 1; 442/1, 30, 56, 32, 43; 427/208.4, 208.8

[56] References Cited

U.S. PATENT DOCUMENTS

| | | | |
|---|---|---|---|
| 3,018,208 | 1/1962 | Werner | 442/43 |
| 3,157,204 | 11/1964 | Phillips | 138/137 |
| 4,022,248 | 5/1977 | Hepner et al. | 138/141 |
| 4,157,410 | 6/1979 | McClintock | 428/40 |
| 4,243,453 | 1/1981 | McClintock | 156/152 |
| 4,264,388 | 4/1981 | McClintock | 156/152 |
| 4,363,684 | 12/1982 | Hay, II | 156/201 |
| 4,389,270 | 6/1983 | McClintock | 428/41.9 |
| 4,450,660 | 5/1984 | Dean et al. | 52/102 |
| 4,576,206 | 3/1986 | Lauren | 138/149 |
| 4,584,217 | 4/1986 | McClintock | 428/40 |
| 4,606,957 | 8/1986 | Cohen | 138/151 |
| 4,614,016 | 9/1986 | Laing et al. | 138/149 |
| 4,713,271 | 12/1987 | Searl et al. | 138/151 |
| 4,748,060 | 5/1988 | Fry et al. | 428/36 |
| 4,772,507 | 9/1988 | Leo et al. | 138/151 |
| 4,778,700 | 10/1988 | Pereira | 428/40 |
| 4,778,703 | 10/1988 | Fontanilla | 428/40 |
| 4,780,347 | 10/1988 | Cohen | 428/34.5 |
| 4,831,080 | 5/1989 | Blizzard et al. | 525/100 |
| 4,842,908 | 6/1989 | Cohen et al. | 428/34.2 |
| 4,857,371 | 8/1989 | McClintock | 428/36.5 |
| 4,996,088 | 2/1991 | Knittel et al. | 428/40 |
| 5,035,518 | 7/1991 | McClintock | 383/70 |
| 5,037,886 | 8/1991 | Blizzard et al. | 525/105 |
| 5,069,969 | 12/1991 | McClintock et al. | 428/36.5 |
| 5,104,701 | 4/1992 | Cohen et al. | 428/34.5 |
| 5,110,649 | 5/1992 | Morse et al. | 428/100 |
| 5,120,587 | 6/1992 | McDermott, III et al. | 428/40 |
| 5,123,453 | 6/1992 | Robbins | 138/149 |
| 5,130,185 | 7/1992 | Ness | 428/41.9 |
| 5,141,793 | 8/1992 | Fontanilla | 428/42 |
| 5,143,574 | 9/1992 | Knittel et al. | 156/307.5 |
| 5,234,520 | 8/1993 | McClintock | 156/218 |
| 5,393,105 | 2/1995 | Petterson et al. | 285/47 |
| 5,405,665 | 4/1995 | Shukushima et al. | 428/34.9 |
| 5,417,901 | 5/1995 | Hartman et al. | 264/45.5 |
| 5,419,589 | 5/1995 | Hartman et al. | 264/51 |
| 5,421,371 | 6/1995 | Lauer | 138/110 |
| 5,427,849 | 6/1995 | McClintock et al. | 428/353 |

FOREIGN PATENT DOCUMENTS 52-71757  6/1977  Japan .

*Primary Examiner*—Nasser Ahmad
*Attorney, Agent, or Firm*—Oldham & Oldham Co., L.P.A.

[57] ABSTRACT

The present invention relates to a combination of an A and B adhesive reacting together through a scrim material in a laminated combination, and wherein the B adhesive has great adherence characteristics to a vinyl nitrile foam, and the A adhesive has great adherence characteristics to itself. Thus a laminate of the A adhesive/scrim/B adhesive to each side of a slit in a vinyl nitrile foam tubular insulation, with appropriate release liners covering the outside A adhesive, has been found to be particularly effective. When the release liners are removed and the A adhesives pressed together, a very strong bond is created closing the slit in the vinyl nitrile foam insulation holding the tubular vinyl nitrile foam in place on the tubular member to be insulated. Normally, this is utilized in an air conditioning application with the piping or tubes running from the compressor to the air conditioning unit, and wherein vinyl nitrile foam insulation has proven to be the best insulating material for this application.

12 Claims, 1 Drawing Sheet

PRESSURE SENSITIVE ADHESIVE CLOSURE SYSTEM FOR FOAM INSULATION

TECHNICAL FIELD

The invention relates to an improved pressure sensitive adhesive laminate which bonds the slit together in a foam insulation application, such as a vinyl nitrile foam insulation. The invention constitutes an A adhesive which tends to stick better to itself, held in a laminated relationship to a B adhesive through a scrim intermediate layer, and wherein the B adhesive has great adherence characteristics to a foam insulation material. There is an interaction between the A and B adhesives through the scrim material whereby when the A adhesives are pressed into contact with each other to close the slit in a foam insulation tubing, forming a very strongly adhering bond.

BACKGROUND OF THE INVENTION

It is well known that pipe insulation to maintain high or low temperatures of a fluid passing through the pipe is maintained by providing a tubular insulation material that is normally slit through one wall longitudinally so as to provide a slit through which the pipe to be insulated can be slipped and the insulation material thus fully surrounds the pipe. The type of insulation material that has proven to be the best in conjunction with air conditioning or refrigeration units is a vinyl nitrile foam which is extruded into a tubular shape with the internal diameter being about the external diameter of the pipe to be insulated, such vinyl nitrile foam being quite flexible, and easily contourable to various radii and/or paths of the pipe to be insulated. Other foam insulation materials are also known. Normally the vinyl nitrile or other type of foam insulation tubing will come in lengths of approximately 6 feet with an internal diameter of 1 to 2 inches and an external diameter of 2 to 3 inches, whereby the thickness of the wall is about ½ to 1½ inches. The 6 foot length is convenient to be handled by a workman installing this insulation material after the refrigeration or air conditioning unit has been put into place, and while the piping connecting the compressor to the heat exchanger is exposed. Typically, the vinyl nitrile tubular foam has a single slit longitudinally of the length so that the slit can be pulled back manually by the installer to slip the tubular insulation over the pipe.

While there have been many systems for closing the slit in such foam pipe insulations, including putting pressure sensitive adhesive on to opposite sides of the slit, and then bringing those adhesives together, there has always been a significant problem in getting good pressure sensitive adhesive anchorage to a vinyl nitrile foam insulation material or other types of foam insulation materials, and still achieving a good pressure sensitive adhesive bonding relationship between the outwardly exposed adhesive to the adhesive on the opposite side of the slit. This is because the adhesive which will have good bonding characteristics to the vinyl nitrile foam insulation will not have good bonding characteristics to itself under stress and/or heat or other temperature extremes. Further, where it is desirable to bond two different adhesives to each other, this has typically caused a weakened interface between the respective adhesives, and hence a potential delamination at the point of the bonding of the two adhesives to each other. Thus, in a situation of this necessity of bonding the opposite sides of the longitudinally slit in the vinyl nitrile foam insulation tubing, the areas of failure can be delamination of the pressure sensitive adhesive at the surface with the vinyl nitrile or other foam insulation material, or at the surface between the adhesive compatible with the vinyl nitrile and the adhesive compatible with itself as well as at the interface of the adhesive compatible with itself. The potential for failure or delamination is particularly apparent when the foam insulation material is bent or shaped along with the pipe to be insulated. Known closure systems have not been able to effectively seal the longitudinal slit around bends which is particularly important in use as a pipe insulation material.

As used herein, the term "pressure sensitive adhesive" means the adhesive is tacky at ambient temperature whereas a "hot melt adhesive" is dependent upon temperature elevation, wherein the adhesive becomes tacky only upon temperature elevation. While the preferred embodiment of this invention appears more applicable to a pressure sensitive adhesive, it could also be applicable to a hot melt adhesive.

BACKGROUND ART

In the instant invention, it is desirable that the pressure sensitive adhesive which hereinafter will be designated as the "A" adhesive is designed to achieve good adherence to a layer of a similar adhesive so that there is a compatibility and interlinking or crosslinking between the respective A adhesives. This type of adhesive system is shown in U.S. Pat. No. 4,996,088 and U.S. Pat. No. 5,037,886, both of which teach the general concept of utilizing a small percentage of dibutyl tin diacetate in combination with a pressure sensitive acrylic adhesive including a small percentage of an organic silicone.

The present invention also includes the concept of laying the A adhesive in juxtaposition in laminated form to the B adhesive by utilizing a scrim interlayer between the A and B adhesives, such scrim being an open mesh, and wherein there is direct contact through the scrim between the A and B adhesives respectively, and a very strong bonded relationship is achieved between the A and B adhesives through the scrim. Typical patents which utilize the general concept of a scrim in conjunction with a pressure sensitive adhesive are U.S. Pat. Nos. 4,363,684 and 5,110,649, but neither of these teach the concept of utilizing the scrim between two layers of separate and distinct pressure sensitive adhesive formulations nor the reaction between these two adhesives. U.S. Pat. No. 5,120,587 teaches a support binder in the form of a scrim which is held in place by a pressure sensitive to a foam material.

OBJECTS OF THE INVENTION

It is a general object of this invention to provide a pressure sensitive adhesive laminate utilizing an A and B adhesive reacting together through an intermediary open mesh scrim material wherein the B adhesive has very high adhering characteristics to a foam insulation material such as a vinyl nitrile foam insulation material, and the A adhesive has very high adherence characteristics to another laminate of the same composition A pressure sensitive adhesive.

It is a further object of the invention to provide a low price but very effective sealing system for vinyl nitrile foam or other foam pipe insulation, and particularly to hold the longitudinal slit in the foam insulation together tightly around bends and contours in the pipe on which it is attached without any delamination occurring at or in the slit.

It is a further object of the invention to provide a pressure sensitive adhesive laminate sealing system for vinyl nitrite foam or other foam pipe insulation which is effective over a wide temperature range for use in a variety of environments and applications.

These and other objects of the invention are achieved by providing a pressure sensitive adhesive laminate including a B adhesive which has very high adhering characteristics to a foam insulation material, an A adhesive reacted with the B adhesive through a scrim open mesh layer, such laminate being applied to each side of a longitudinal slit in the foam insulation such as a vinyl nitrite foam insulation tubing, with a release liner covering each of the A adhesive layers, where upon removal of the release liners, the A pressure sensitive adhesive layers compatibly and vigorously adhere to each other, holding the slit in the foam insulation material together.

BRIEF DESCRIPTION OF THE DRAWINGS

For a better understanding of the invention, reference should be made to the accompanying drawings wherein.

DETAILED DESCRIPTION OF THE INVENTION

Figure 1:
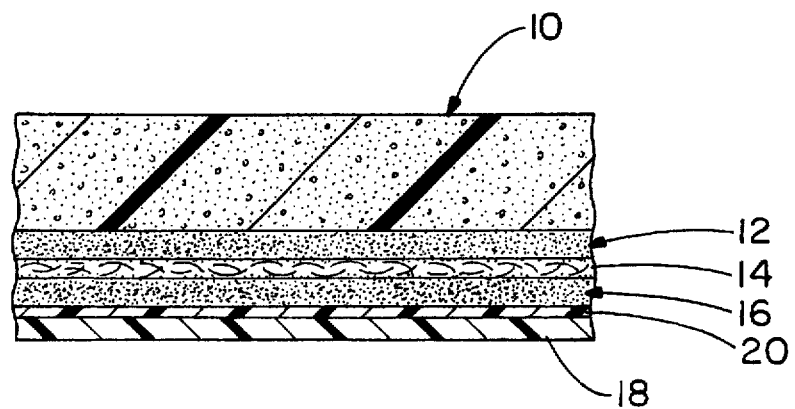
FIG. 1 is an enlarged cross-sectional schematic of the improved adhesive laminate material of the invention.

With specific reference of FIG. 1 of the drawings and a preferred embodiment, the numeral 10 indicates generally a vinyl nitrile foam which is the preferred foam insulation utilized particularly for air conditioning and refrigeration lines to maintain high and/or low temperatures in the piping systems associated with such overall configurations. Typically the vinyl nitrile foam insulation will be extruded in a tubular configuration and longitudinally slit to allow it to slip over the pipe, and the purpose of this invention is to provide a closure system for the longitudinal slit in such vinyl nitrile foam pipe insulation.

The numeral 12 generally indicates what is designated as an adhesive B, and the details of adhesive B will be described in further detail hereinbelow. The numeral 14 generally indicates a scrim material which is an open mesh either woven or unwoven, but having great propensity to allow an intermix of the adhesive B with the adhesive A which is designated generally by numeral 16, and again the particular characteristics of adhesive A will be defined more fully hereinbelow.

Completing the structural arrangement of the laminate, a release liner indicated generally by number 18 having normally a silicone layer 20 is adhered to protect adhesive A, and once this liner is removed, then adhesive A is exposed, in the typical way for a pressure sensitive adhesive.

Figure 2:
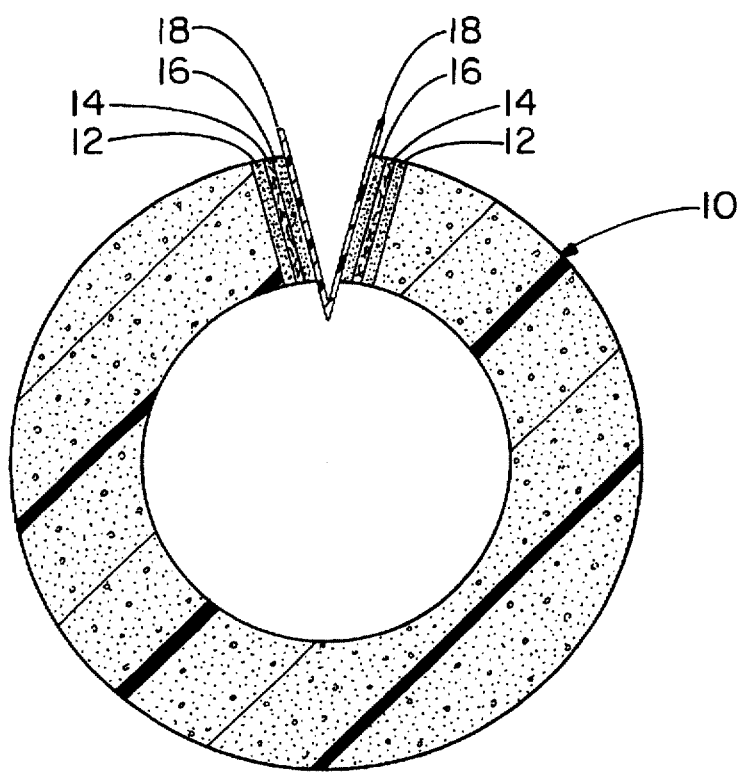
FIG. 2 is a cross-sectional view of the vinyl nitrile foam insulation material showing the positioning of the improved adhesive pressure sensitive adhesive laminate designed to seal and fully enclose the longitudinal slit allowing the pipe to be inserted into and surrounded by the foam insulation material.

Now looking at FIG. 2, the vinyl nitrile foam insulation is again indicated by numeral 10 and the other layers similarly are indicated except for the silicone layer 20 which should be understood is included on the side of the release liner attached to the adhesive A designated by numeral 16.

In association with the foam insulation material, the closure system according the invention is designed to be effective over a temperature range of −20 degrees F. to 220 degrees F. The system also functions to maintain the closure of the slit around bends, contours and the like in the pipe, and particularly enables bending of the foam insulation material around bends in the range between 0° and less 180° without delamination or splitting of the seal at either the interface with the vinyl nitrile or other foam insulation material, or at the interface between the A and B adhesives as well as at the interface of the A adhesive compatible with itself.

Adhesive A Preferably is the adhesive taught in U.S. Pat. Nos. 5,143,574 or 4,996,088 and is used at a dried thickness of 0.1 to 8 mils with 1.0 to 3.0 being optimum.

Essentially, pressure sensitive adhesive A is a mixture of a pressure sensitive acrylic adhesive having mixed therein 0.5 to about 10% and preferably about 4–6% of a silicone, as well as a catalyst. In some instances it may not be necessary to utilize the silicone, but the preferable catalyst is a catalytic organic tin compound wherein the tin has a valance of 4 or 2 and generally the organic portion contains alkyls, aryls, cycloalkyls and alkylates. The catalyst compounds that are compatible with the acrylic adhesive are preferred. Preferably the quantity of the catalyst is about 5% dibutyl tin diacetate. Typically the acrylic pressure sensitive adhesive is mixed with a suitable solvent in the manner well known by those of ordinary skill in the art, and spread and dried in the standard procedure associated with pressure sensitive adhesive products.

Non-limiting examples of the catalysts contemplated for use in the reaction are metal salts of carboxylic acids using metals such as lead, zinc, tin, iron, cadmium, lead, barium, calcium and manganese. Particularly effective would be the naphthalates, octoates, hexoates, laurates and acetates. Preferred salts are dibutyltin diacetate, dibutyltin dilaurate and stannous octoate.

Adhesive B Suitable polymerizable vinyl monomers for the purpose of this invention include acrylic monomers and mixtures of monomers, such as methyl methacrylate, ethyl methacrylate, acrylonitrile, methyl acrylate, ethyl acrylate, butyl methacrylate, cyclohexyl acrylate, hexyl acrylate, 2-ethylhexyl acrylate, lauryl acrylate, methacrylic acid, acrylic acid, glycidyl methacrylate, itaconic acid, ethylene glycol and higher-glycol acrylates and methacrylates, acrylamide, and methacrylamide; halogenated monomers such as vinylidene chloride, chlorostyrene, 1,2-dichloro-1, 3-butadiene, and 2-chloro-1,3-butadiene; and styrene and mono and polyalkylstyrenes, such as methylstyrene, ethylstyrene, or tert-butylstyrene. The preferred monomers are acrylic monomers, especially lower alkyl acrylates and methacrylates and ethylene glycol diacrylate and dimethacrylate and their mixtures. The preferred embodiment would be a soft acrylic comprising ethylhexyl acrylate and methyl acrylate.

The soft acrylic provides a fairly low initial adhesion bond to the vinyl nitrile foam, however, the tack and adhesion increases over time because the adhesive tends to absorb the various migrating fillers (i.e. plasticizers, sterates, etc.) from the surface of the vinyl nitrile foam. Thus the bond improves over time based upon the surface migration of these migrating fillers from the vinyl nitrile foam. Hence a fairly long dwell time of probably greater than at least 24 hours is important to get a proper adhesion to the vinyl nitrile foam.

It is a further property of the soft acrylic B adhesive of this type that it does not stick well to itself under heat and/or stress. Thus, the use of the A adhesive having excellent adhesion to itself under heat and/or stress is what makes this combination work so well. Naturally, any of the above-described acrylate and polyacrylate ester species can be used in combination if desired. Many of the high molecular weight acrylate esters described above are extremely viscous and advantageously are mixed (diluted) with a low viscosity acrylate ester, such as an alkyl acrylate ester to get the desired compatibility. Also, polyvinyl acetate may be used.

The choice of the monomer will, of course, depend to some extent on the desired adhesive properties. Solutions having a Brookfield viscosity of more than about 1 million cps (ASTM V 490.0500) are impractical to handle. When rigid assemblies having high shear strength are required, the monomer mixture should have a high glass transition temperature, for example, using methyl methacrylate of a glass transition temperature of 105° C. For more flexible structures, e.g., where the adhesive layer is intended to contribute to vibration dampening at room temperature, a glass transition temperature of the combined copolymer of about −20° C. is preferred. Also, compatible monomers of vinyl acetate may be used to modify the properties thereof. These may be copolymers of acrylates and vinyl acetate, or homopolymers of vinyl acetate.

Sometimes it is desirable to choose monomers that have special end group termination or other structures as shown below which are well known to pressure sensitive adhesive chemists. Examples of these end groups are carboxyl, hydroxyl, amine or amide groups.

Other acceptable monomers which can be used in the adhesives disclosed herein are the acrylate terminated epoxy or ester units, or low molecular weight polymers thereof.

Primer: Use of primer on foam insulation may, in some circumstances, give unexpected improved results. The foam insulation can be open-celled, closed-cell and microporous preferable with a relatively thick integral skin. The primers containing precipitated or fumed silica serve to reduce or fill the pores of the foam. The porous foam insulation that has been primed gives a better bond with the adhesives, especially when the primer contains from 10 to 65% polymeric rubbers or resinous material. Although essentially all solvents are useful, caution must be taken where the solvent tends to destroy the insulation material.

Although any of the primers may be used with some foams, the ones most desired use hydrocarbon or chlorohydrocarbon solvents such as toluene or chlorohexane and contain about 1% to 30% and preferably 5% to 20% by weight of a finely divided powdery silica, usually referred to as precipitated or fumed silica and available under the tradename of Cab-O-Sil. It is most desirable that the primer contain a polymeric material to give the primer body and to aid in maintaining the finely divided silica in suspension. A very desirable primer is a toluene suspension of about 5% to 30% finely divided powdery silica, and about 10% to 60% of a polymer on a weight basis. Preferably acrylic or methacrylic ester polymers are used. Well-known solvents other than toluene may be used. The acrylic esters may be the esters of the lower alcohols such as ethyl, propyl, butyl, 2-ethylhexyl with the acids of acrylic and methacrylic to give methyl acrylate, methyl methacrylate, ethyl acrylate, ethyl methacrylate, butyl acrylate, butyl methacrylate, 2-ethylhexyl acrylate, and 2-ethylhexyl methacrylate alone or mixtures thereof or with polyvinyl acetate. A very preferred primer is a mixture of about 8% to 15% precipitated silica, about 18% to 28% of the acrylic ester known as Acryloid-72 and 57% to 74% toluene.

Carrier: Although many carriers 14 (PE, PP, vinyl, paper, etc.) can be used, our choice is a scrim having a thickness of 0.1 to 10 mils. It is also possible to make the product with no carrier. A scrim is either a woven or unwoven flexible material having relatively large holes allowing for a thorough intermix between the A and B adhesives through the holes in the scrim. Typically, it is thought that holes of about 1/64" to about 1/4" opening size would be quite suitable to achieve the objects of the invention. The preferred scrim has the following structural properties:

| BASIS WEIGHT, oz/sq yd | | 0.47–1.44 |
|---|---|---|
| WEIGHT, lbs/1000 sq ft | | 3.26–10 |
| THICKNESS, mils | | 3.6–9.2 |
| TENSILE, lbs | MD | 14–73 |
| | CD | 18–46 |
| ELONGATION | MD | 16–21 |
| | CD | 18–23 |
| TRAPEZOID TEAR, lbs | MD | 3–15 |
| | CD | 4–13 |
| ELMENDORF TEAR, grams | MD | 340–2350 |
| | CD | 310–2500 |
| MULLEN BURST, lbs/sq in | | 80–136 |

These structural characteristics provide a non-limiting example of scrim which is useful in the invention. Such scrim fabric comes in a variety of styles and designs (e.g., double warp web), weights and thicknesses. For example, the scrim product can range in weight from 1.44 oz./sq. yd. to 0.47 oz./sq. yd. although higher and lower weights are contemplated within the scope of the invention.

Processing: One of the unique characteristics of this concept is the reaction between not only adhesive A to adhesive A in the final construction, but the reaction between adhesive A and adhesive B during processing. By applying wet adhesive A onto a release liner, drying (driving off solvents) and then laminating a scrim carrier, (scrim being an open "net" type of film), we are able to apply wet adhesive B directly onto adhesive A and react the two adhesives together with the scrim being imbedded. The exposed adhesive B may then be adhered to the foam to complete the construction. This process is also possible without the use of any carrier; however, the scrim method is the preferred process.

Final Construction: A final preferred construction may be a self-wound double face, reacting two different acrylics having a scrim carrier. In such a configuration, the release liner may be provided with a release layer on both sides of the liner, allowing the construction to be wound upon itself in a roll form before attachment to the foam insulation material, wherein an exposed layer of the B adhesive would contact the opposite side of the release liner. A second release liner can be used as well as other or no carriers, as for example if this product is made in sheet form, providing a release liner on both sides of the laminate construction before attachment to the foam insulation material. In another arrangement, and with reference to FIG. 2, both sides of the system, with each side comprising the A and B adhesives and intermediate scrim layers, may be formed together with a single central release liner disposed therebetween. In such a configuration, a sheet product may be formed with outer release liners provided for the exposed B adhesive layers prior to attachment to the foam insulation material, or alternatively a single outer release liner having release layer on both sides may be used in a self-wound configuration. With both sides of the sealing system formed in a single laminate, subsequent attachment to an insulation material may be performed by attachment of the B adhesive layers to the opposed sides of the slit, and then removal of the central release liner from the position between the A adhesive layers for completing the seal. Also, although the present invention has been described with reference to foam insulation materials, the closure system may be advantageously used in conjunction with other types of insulation materials. For example, conventional fiberglass insulation materials using an outer service jacket, referred to as ASJ insulators, may use the adhesive laminate construction to seal the service jacket to itself at the location of the slit associated therewith.

While in accordance with the patent statutes, only the best known embodiment of the invention is illustrated and described in detail. It is to be particularly understood that the invention is not limited thereto or thereby, but that the inventive scope is to defined in the appended claims.

What is claimed is:

1. A sealable insulation enclosure comprising:
   (a) an essentially tubular body of foamed insulation material having a longitudinal slit and an opening disposed therethrough, the slit having a pair of essentially opposed surfaces;
   (b) at least one first adhesive bonded to said opposed surfaces of said longitudinal slit, said first adhesive characterized in having high adherence to the foamed insulation;
   (c) a layer of scrim overlaying the first adhesive, the scrim having a plurality of openings disposed therethrough, the first adhesive penetrating said scrim;
   (d) at least one layer of one second pressure-sensitive adhesive, said second adhesive characterized in having high adherence to itself and bonded to the first adhesive wherein the first and second adhesives are of different composition; wherein said at least one second adhesive adheres to one another to close said longitudinal slit.

2. The enclosure of claim 1 wherein the body of insulation material is formed of a foamed polymeric material.

3. The enclosure of claim 2, wherein, said foamed polymeric material is a vinyl nitrile foam.

4. The enclosure of claim 1 wherein the second adhesive is selected from polymers of monomers which are selected from the group consisting of methyl methacrylate, ethyl methacrylate, acrylonitrile, methyl acrylate, ethyl acrylate, butyl methacrylate, cyclohexyl acrylate, hexyl acrylate, 2-ethylhexyl acrylate, lauryl acrylate, methacrylic acid, acrylic acid, glycidyl methacrylate, itaconic acid, alkylene glycol, alkylene glycol acrylates, alkylene glycol methacrylates wherein the alkylene ranges from 2 to 8 carbons, acrylamide, methacrylamide, vinylidene chloride, chlorostyrene, 1,2-dichloro-1,3-butadiene, 2-chloro-1,3-butadiene, styrene, polyalkylstyrenes wherein the alkyl group is from 1 to 6 carbons and mixtures thereof.

5. The enclosure of claim 1 wherein the second adhesive is an acrylic-based adhesive.

6. The enclosure of claim 1 wherein the first and second adhesives are of different compositions.

7. A sealable insulation enclosure comprising:
   (a) an essentially tubular body of foamed insulation material having a longitudinal slit and an opening disposed therethrough, the slit having a pair of essentially opposed surfaces;
   (b) at least one first adhesive bonded to each surface of the longitudinal slit said first adhesive characterized in having high adherence to the foamed insulation;
   (c) at least one layer of one second pressure-sensitive adhesive, said second adhesive characterized in having high adherence to itself and bonded to the first adhesive, the second adhesive forming a chemical bond with the first adhesive wherein said first and second adhesives are of different composition; and
   (d) a release liner overlaying the second adhesive.

8. The enclosure of claim 7 which further comprises a layer of scrim interposed between the first and the second adhesives, said scrim having a mesh size such that the first and second adhesives come into direct contact.

9. The enclosure of claim 7 wherein the second adhesive is selected from polymers of monomers which are selected from the group consisting of methyl methacrylate, ethyl methacrylate, acrylonitrile, methyl acrylate, ethyl acrylate, butyl methacrylate, cyclohexyl acrylate, hexyl acrylate, 2-ethylhexyl acrylate, lauryl acrylate, methacrylic acid, acrylic acid, glycidyl methacrylate, itaconic acid, alkylene glycol, alkylene glycol acrylates, alkylene glycol methacrylates wherein the alkylene ranges from 2 to 8 carbons, acrylamide, methacrylamide, vinylidene chloride, chlorostyrene, 1,2-dichloro-1,3-butadiene, 2-chloro-1,3-butadiene, styrene, polyalkylstyrenes wherein the alkyl group is from 1 to 6 carbons and mixtures thereof.

10. The enclosure of claim 7 wherein the second adhesive is an acrylic-based adhesive.

11. A sealable foamed polymeric enclosure comprising:
   (a) an essentially tubular foamed polymeric body having a longitudinal slit and an opening disposed therethrough, the slit having a pair of essentially opposed surfaces;
   (b) at least one first adhesive bonded to each surface of the longitudinal slit, said first adhesive characterized in having high adherence to the foamed insulation;
   (c) a layer of scrim overlaying the first adhesive, the scrim having a plurality of openings disposed therethrough, the first adhesive penetrating said scrim;
   (d) at least one layer of one second pressure-sensitive adhesive, said second adhesive characterized in having high adherence to itself and bonded to the first adhesive, the second adhesive also being capable of penetration through the scrim; and
   (e) a release liner overlaying the second adhesive.

12. A sealable insulation enclosure comprising:
   (a) an essentially tubular body of foamed insulation material having a longitudinal slit and an opening disposed therethrough, the slit having a pair of essentially opposed surfaces;
   (b) at least one first adhesive bonded to said opposed su faces of said longitudinal slit, said first adhesive characterized in having high adherence to the foamed insulation;
   (c) a layer of scrim over laying the first adhesive, the scrim having a plurality of openings disposed therethrough, the first adhesive penetrating said scrim; and
   (d) at least one layer of one second pressure-sensitive adhesive, said second adhesive characterized in having high adherence to itself and bonded to the first adhesive wherein the first and second adhesives are of different composition;
   wherein said at least one second adhesive adheres to one another to close said longitudinal slit, and
   wherein said first and second adhesives are of different composition.

* * * * *